US012101691B2

(12) United States Patent
Givehchian et al.

(10) Patent No.: US 12,101,691 B2
(45) Date of Patent: Sep. 24, 2024

(54) RF-SENSING-BASED HUMAN IDENTIFICATION USING COMBINED GAIT AND SHAPE RECOGNITION

(71) Applicant: QUALCOMM Incorporated, San Diego, CA (US)

(72) Inventors: Hadi Givehchian, La Jolla, CA (US); Xiaoxin Zhang, Sunnyvale, CA (US); Peyman Siyari, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 17/659,602

(22) Filed: Apr. 18, 2022

(65) Prior Publication Data

US 2023/0336946 A1  Oct. 19, 2023

(51) Int. Cl.
*H04W 4/02* (2018.01)
*G01S 5/02* (2010.01)
*H04W 4/029* (2018.01)
*H04W 64/00* (2009.01)

(52) U.S. Cl.
CPC .......... *H04W 4/029* (2018.02); *G01S 5/0246* (2020.05); *G01S 5/0273* (2013.01); *G01S 5/0294* (2013.01)

(58) Field of Classification Search
CPC .... H04W 4/029; G01S 5/0246; G01S 5/0273; G01S 5/0294
See application file for complete search history.

(56) References Cited

U.S. PATENT DOCUMENTS

| | | | |
|---|---|---|---|
| 11,610,204 B1* | 3/2023 | Osterkamp | G07C 9/37 |
| 2016/0350610 A1 | 12/2016 | Yoo et al. | |
| 2017/0354349 A1* | 12/2017 | Mohapatra | A61B 5/7203 |
| 2019/0028320 A1* | 1/2019 | Xu | H04L 27/362 |
| 2020/0202117 A1* | 6/2020 | Wu | G06F 21/32 |
| 2020/0218793 A1 | 7/2020 | Storm et al. | |
| 2020/0319371 A1* | 10/2020 | Chen | G01V 8/005 |
| 2021/0103031 A1 | 4/2021 | Cohen et al. | |

(Continued)

FOREIGN PATENT DOCUMENTS

EP  3695783 A1  8/2020

OTHER PUBLICATIONS

International Search Report and Written Opinion—PCT/US2023/062830—ISA/EPO—May 12, 2023.

(Continued)

*Primary Examiner* — Moustapha Diaby
(74) *Attorney, Agent, or Firm* — Thien T. Nguyen

(57) ABSTRACT

In some implementations, a method may comprise obtaining channel state information (CSI) data corresponding to a set of RF signals received by one or more receiving devices, wherein: the set RF signals comprises two or more reflected RF signals successively received by the one or more receiving devices after being reflected from a person, and the two or more reflected RF signals are received by the one or more receiving devices over a period of time. The method may further comprise determining an identity of the person based at least in part on an observed gait of the person and an observed shape of the person, wherein the observed gait of the person and the observed shape of the person are determined based at least in part on the CSI data. The method may further comprise outputting an indication of the determined identity of the person.

31 Claims, 10 Drawing Sheets

(56) References Cited

U.S. PATENT DOCUMENTS

| | | | |
|---|---|---|---|
| 2021/0173046 A1* | 6/2021 | Regani | G01S 13/44 |
| 2021/0312777 A1 | 10/2021 | Ghourchian et al. | |
| 2022/0026530 A1* | 1/2022 | Wu | G01S 7/006 |
| 2022/0304051 A1* | 9/2022 | Aboul-Magd | H04B 7/0626 |
| 2023/0209325 A1* | 6/2023 | Lee | G06N 3/09 |
| | | | 370/338 |
| 2023/0246721 A1* | 8/2023 | Vodovozov | H04B 17/391 |
| | | | 370/329 |

OTHER PUBLICATIONS

Kalyanaraman A., et al., "Forma Track: Tracking People Based on Body Shape", Proceedings of the ACM on Interactive, Mobile, Wearable and Ubiquitous Technologies, ACMPUB27, New York, NY, USA, vol. 1, No. 3, Sep. 11, 2017, pp. 1-21, XP058484817, DOI: 10.1145/3130926, p. 61:1-61:4.

Wang W., et al., "Gait Recognition using Wifi Signals", User Interface Software and Technology, ACM, 2 Penn Plaza, Suite 701 New York 10121-0701, USA, Sep. 12, 2016, pp. 363-373, XP058518363, DOI: 10.1145/2971648.2971670, ISBN: 978-1-4503-4531-6, Abstract, p. 363-368.

* cited by examiner

RF-SENSING-BASED HUMAN IDENTIFICATION USING COMBINED GAIT AND SHAPE RECOGNITION

BACKGROUND

1. Field of Disclosure

The present disclosure relates generally to object or motion detection, and more particularly, to the use of radiofrequency (RF) sensing of a human.

2. Description of Related Art

Human identification is utilized in an increasing number of applications, including building security, law-enforcement, retail environments, healthcare environments, and so forth. Camera-based human identification has been used traditionally, but these methods may be rendered ineffective with poor lighting and/or conclusions and may raise privacy concerns. RF sensing, or sensing based on RF signals, may not be affected by lighting or certain occlusions. However, RF-sensing-based human identification traditionally has been less accurate than other techniques.

BRIEF SUMMARY

Embodiments described herein address these and other issues by providing accurate RF sensing using combined gait recognition and shape recognition. Embodiments may utilize techniques in which channel state information (CSI) data, corresponding to RF signals reflected from person over a period of time, is used for both gait and shape recognition. Outputs of gait and shape recognition algorithms may be combined to perform enhance human identification at a higher accuracy than either gait or shape recognition alone.

An example method of radio frequency (RF) sensing for human identification, according to this disclosure, may comprise obtaining channel state information (CSI) data corresponding to a set of RF signals received by one or more receiving devices, wherein the set RF signals comprises two or more reflected RF signals successively received by the one or more receiving devices after being reflected from a person, and the two or more reflected RF signals are received by the one or more receiving devices over a period of time. The method also may comprise determining an identity of the person based at least in part on an observed gait of the person and an observed shape of the person, wherein the observed gait of the person and the observed shape of the person are determined based at least in part on the CSI data. The method also may comprise outputting an indication of the determined identity of the person.

An example device for radio frequency (RF) sensing for human identification, according to this disclosure, may comprise one or more transceivers, a memory, one or more processors communicatively coupled with the one or more transceivers and the memory, wherein the one or more processors are configured to obtain channel state information (CSI) data corresponding to a set of RF signals received by one or more receiving devices, wherein: the set RF signals comprises two or more reflected RF signals successively received by the one or more receiving devices after being reflected from a person, and the two or more reflected RF signals are received by the one or more receiving devices over a period of time. The one or more processors further may be configured to determine an identity of the person based at least in part on an observed gait of the person and an observed shape of the person, wherein the observed gait of the person and the observed shape of the person are determined based at least in part on the CSI data. The one or more processors further may be configured to output an indication of the determined identity of the person.

An example apparatus for radio frequency (RF) sensing for human identification, according to this disclosure, may comprise means for obtaining channel state information (CSI) data corresponding to a set of RF signals received by one or more receiving devices, wherein: the set RF signals comprises two or more reflected RF signals successively received by the one or more receiving devices after being reflected from a person, and the two or more reflected RF signals are received by the one or more receiving devices over a period of time. The apparatus further may comprise means for determining an identity of the person based at least in part on an observed gait of the person and an observed shape of the person, wherein the observed gait of the person and the observed shape of the person are determined based at least in part on the CSI data. The apparatus further may comprise means for outputting an indication of the determined identity of the person.

According to this disclosure, an example non-transitory computer-readable medium stores instructions for radio frequency (RF) sensing for human identification, the instructions comprising code for obtaining channel state information (CSI) data corresponding to a set of RF signals received by one or more receiving devices, wherein the set RF signals comprises two or more reflected RF signals successively received by the one or more receiving devices after being reflected from a person, and the two or more reflected RF signals are received by the one or more receiving devices over a period of time. The instructions further may comprise code for determining an identity of the person based at least in part on an observed gait of the person and an observed shape of the person, wherein the observed gait of the person and the observed shape of the person are determined based at least in part on the CSI data. The instructions further may comprise code for outputting an indication of the determined identity of the person.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
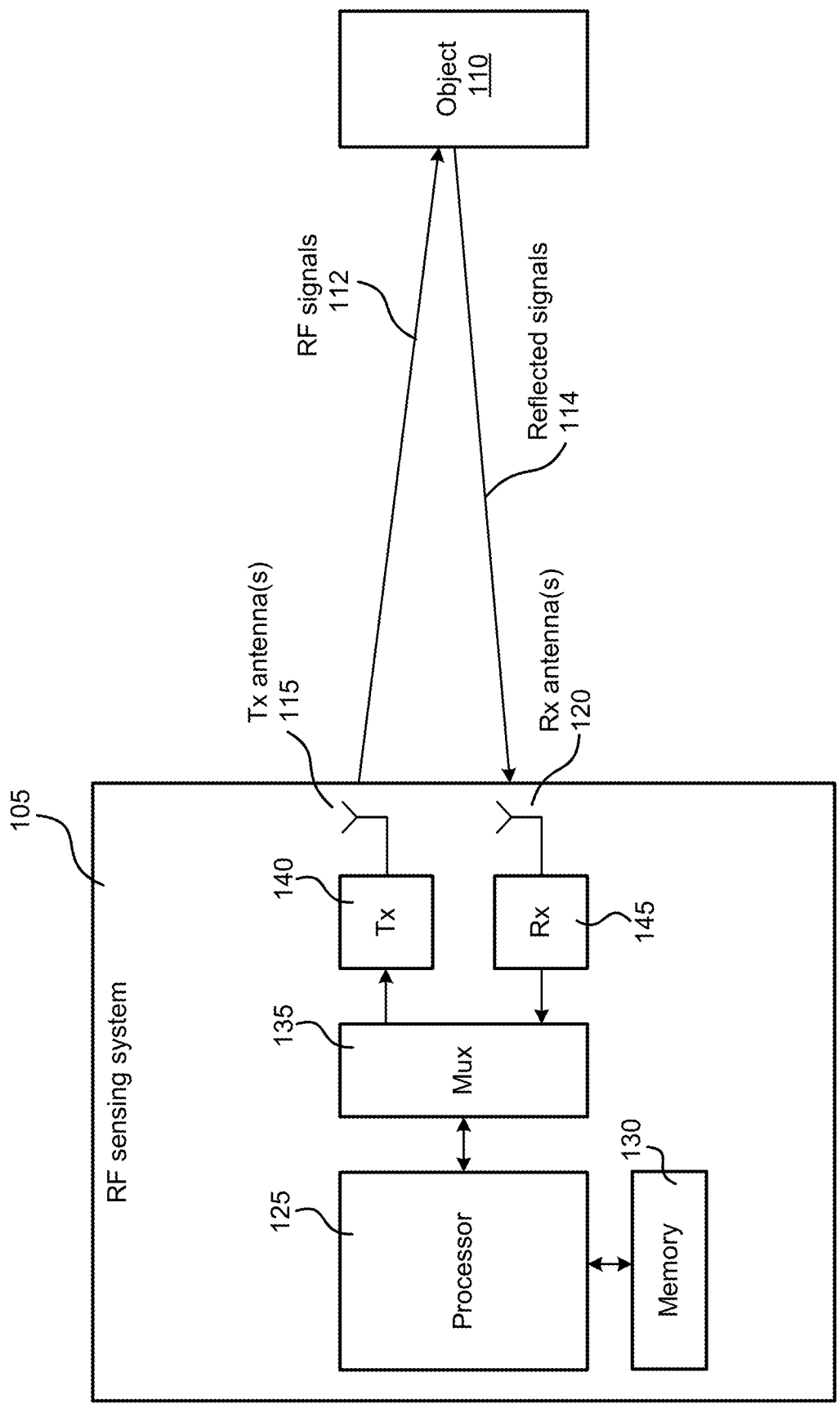
FIG. 1 is a block diagram of an example radiofrequency (RF) sensing system capable of performing RF sensing according to embodiments described herein.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. Some examples in this disclosure may be based on wireless local area network (WLAN) communication according to the Institute of Electrical and Electronics Engineers (IEEE) 802.11 wireless standards, including those identified as Wi-Fi technologies. However, the described implementations may be implemented in any device, system or network that is capable of transmitting and receiving radio frequency (RF) signals according to any communication standard, such as any of the IEEE 802.11 standards, the Bluetooth® standard, ultra-wideband (UWB) and/or other technologies based on IEEE 802.15.x standards, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal and/or one or more received RF signals.

As noted, RF sensing techniques for human identification can provide advantages over traditional camera-based techniques. RF signals are not affected by the lighting, and RF signals at Wi-Fi/Bluetooth/UWB/5G frequencies, for example, can penetrate through walls and certain occlusions. In addition, unlike wearable sensors, RF sensing does not require a person to wear any equipment, and the hardware required for RF sensing such as Wi-Fi access points are often already available in most indoor environments or other environments where human identification is used. Thus, it may be possible to implement RF sensing with little or no added cost in the field by means of a firmware update to Wi-Fi access points, Bluetooth transceivers, etc.

According to embodiments herein, RF-sensing-based human identification may be performed using one or more wireless devices (e.g., Wi-Fi access points, Bluetooth transceivers, UWB transceivers, 5G devices, etc.). Because gait recognition (the recognition of the way in which people move) alone may be insufficient in some applications to uniquely identify certain individuals, identification may be based on a combination of gait recognition and shape recognition to increase the accuracy of human identification based on RF sensing.

Figure 10:
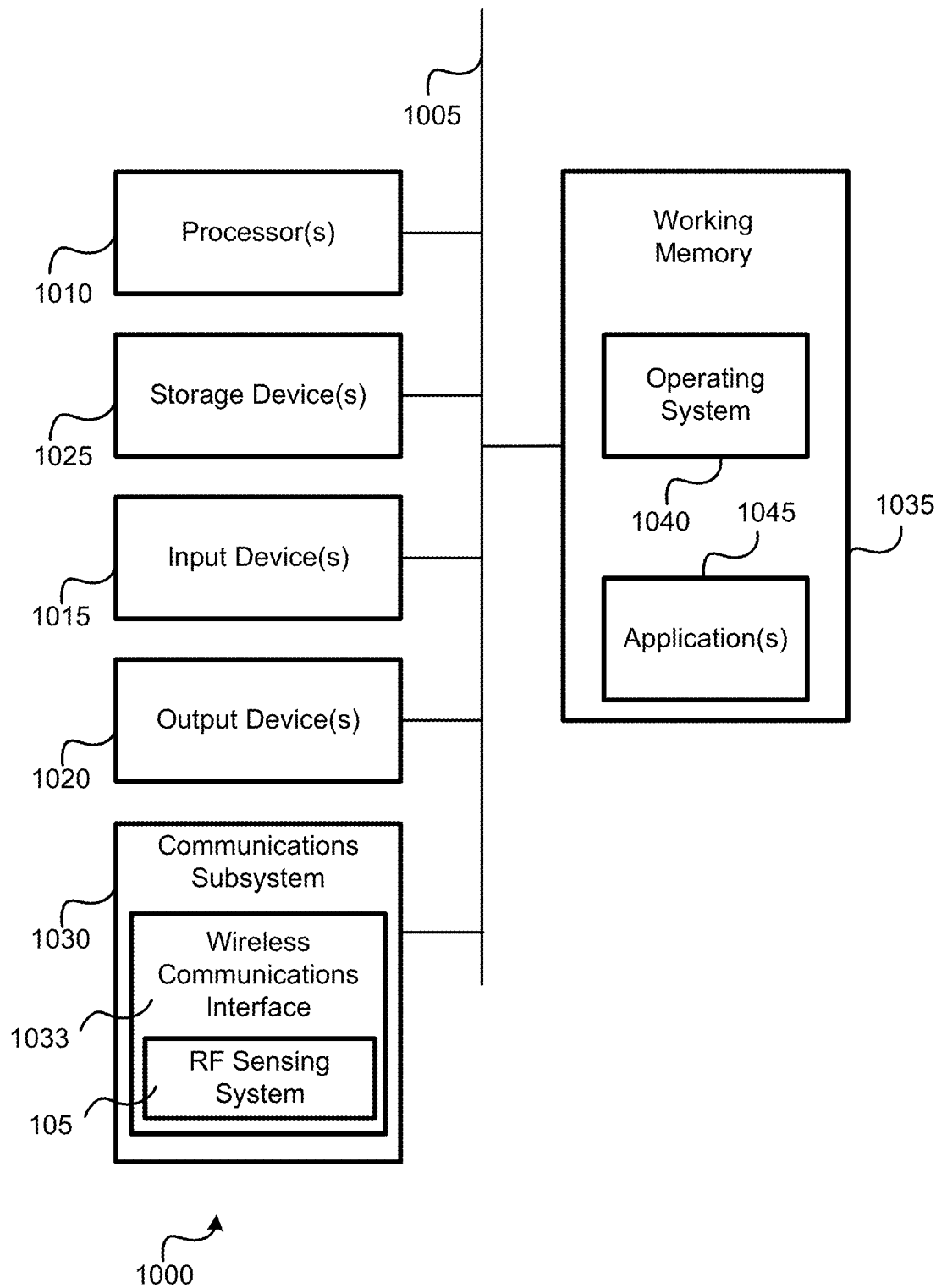
FIG. 10 is a block diagram of an embodiment of a computing system, which can be utilized in embodiments as described herein.

FIG. 1 is a block diagram of an example RF sensing system 105 capable of performing human identification based on RF sensing as described herein. In brief, the RF sensing system 105 uses RF signals comprising one or more waveforms, sequences, or packets to determine the presence and/or movement of an object. This can be done by using RF signals for channel capture to obtain a Channel Impulse Response (CIR), a Channel Frequency Response (CFR), and/or other forms of Channel State Information (CSI) indicative of the presence and/or movement of the object. The RF sensing system 105 may comprise a standalone device or may be integrated into a larger electronic device, such as a wireless security camera, Wi-Fi access point, Bluetooth transceiver, UWB transceiver, etc. (Example components of such a larger electronic device, including an RF sensing system 105, are shown in FIG. 10, and discussed in detail hereafter.) Although the example in FIG. 1 illustrates a monostatic system in which RF signals 112 are transmitted and received at a single device (e.g., RF sensing system 105), embodiments are not so limited. Embodiments may include, for example, a bistatic or multi-static system in which RF signals 112 are transmitted by one device and reflected signals 114 (reflections of RF signals 112) are received by another.

Generally speaking, with regard to the functionality of the RF sensing system 105 in FIG. 1, the RF sensing system 105 can detect an object 110 by generating RF signals 112 (e.g., comprising one or more pulses) transmitted by one or more Tx antenna(s) 115 that reflect off of the object 110 and the reflected signals 114 are received by one or more Rx antennas. The received signals can then be processed by the RF sensing system 105 using digital signal processing (DSP) techniques (including leakage cancellation) to determine the object's range. Moreover, in some embodiments, an RF sensing system 105 may have a plurality of Rx antenna(s) 120. (WLAN radios, for example, commonly have 2 to 4 antennas.) More generally, Tx antenna(s) 115 and/or Rx antenna(s) 120 may comprise an one or more antenna arrays (e.g., 1D and/or 2D arrays), enabling the Tx antenna(s) 115 and/or Rx antenna(s) 120 to be used in RF beamforming, enabling the RF sensing system 105 to respectively transmit RF signals 112 in certain directions (e.g., azimuths and/or elevations) and/or determine similar directional or angular information regarding received reflected signals 114. In such embodiments, CSI received at different Rx antenna(s) 120 can be used to determine angular information (e.g., by using Rx beamforming, determining angular information phase differences, or the like). In some implementations, embodiments with two antennas have achieved angular granularity of 10° to 15°, for example, and embodiments with four antennas have achieved granularity of 2° to 3°. Moreover, in some other embodiments, an RF sensing system 105 may have a plurality of Tx antennas 115. (WLAN radios, for example, commonly have 2 to 4 antennas.) In such embodiments, the phase of the Tx antennas can be configured to transmit the RF signals 112 in a beam pointing at a certain direction. In some implementations, embodiments with two Tx antennas have achieved angular granularity of 10° to 15°, for example, and embodiments with four Tx antennas have achieved granularity of 2° to 3°. Thus, the RF sensing system 105 can "scan" a space or volume by using beamforming to use different Tx and/or Rx beams to respectively transmit RF signals 112 and/or receive reflected signals 114 in different directions (e.g., in different azimuth and/or elevation angles) across the space or volume. Further, changes in CSI over time are indicative of motion of the object 110. Thus, RF signals can be used to determine object location (e.g., angle and range), volume (or shape), and movement. As described hereafter, in the case where object 110 is a human, RF sensing in this manner can be used to detect and identify a human.

This functionality of the RF sensing system 105 is enabled through the use of a processor 125, memory 130, multiplexer (mux) 135, Tx processing circuitry 140, and Rx processing circuitry 145. (The RF sensing system 105 may include additional components not illustrated, such as a power source, user interface, or electronic interface.) It can be noted, however, that these components of the RF sensing system 105 may be rearranged or otherwise altered in alternative embodiments, depending on desired functionality. Moreover, as used herein, the terms "transmit circuitry," "Tx circuitry," or "Tx processing circuitry" refer to any circuitry utilized to create and/or transmit RF signals 112. Likewise, the terms "receive circuitry," "Rx circuitry," or "Rx processing circuitry" refer to any circuitry utilized to detect and/or process the reflected signals 114. As referred to herein, data resulting from a scan (e.g., as processed using received circuitry) may itself be referred to as a "scan." As such, "transmit circuitry" and "receive circuitry" may not only comprise the Tx processing circuitry 140 and Rx processing circuitry 145 respectively but may also comprise the mux 135 and processor 125. In some embodiments, the processor 125 may compose at least part of a modem and/or wireless communications interface (e.g., wireless communications interface 1033 of FIG. 10, described hereinafter). In some embodiments, more than one processor may be used to perform the functions of the processor 125 described herein. Additionally, although Tx antenna(s) 115 and Rx antenna(s) 120 are illustrated as being separate antennas, some embodiments may use the same one or more antennas for transmission and reception.

The Tx processing circuitry 140 and Rx processing circuitry 145 may comprise subcomponents for respectively generating and detecting RF signals. As a person of ordinary skill in the art will appreciate, the Tx processing circuitry 140 may therefore include a pulse generator, digital-to-analog converter (DAC), a mixer (for up-mixing the signal to the transmit frequency), one or more amplifiers (for powering the transmission via Tx antenna(s) 115), etc. The Rx processing circuitry 145 may have similar hardware for processing a detected RF signal. In particular, the Rx processing circuitry 145 may comprise an amplifier (for amplifying a signal received via Rx antenna(s) 120), a mixer for down-converting the received signal from the transmit frequency, an analog-to-digital converter (ADC) for digitizing the received signal, and a pulse correlator providing a matched filter for the pulse generated by the Tx processing circuitry 140. The Rx processing circuitry 145 may therefore use the correlator output as the CIR, which can be processed by the processor 125 (or other circuitry) for leakage cancellation, for example. Other processing of CSI obtained from the reflected signals 114 may also be performed, such as object detection, range, motion, direction of departure (DoD) or direction of arrival (DoA) estimation.

It can be noted that the properties of the transmitted RF signal 112 (and reflected signals 114) may vary, depending on the technologies utilized. As noted, techniques provided herein can apply to WLAN technologies, which typically operate at 2.4, 5, and 6 GHz, but may include frequencies ranging from 900 MHz to 60 GHz, for example. This includes, for example, frequencies utilized by the 802.11ad Wi-Fi standard (operating at 60 GHz). That said, some embodiments may utilize RF frequencies outside this range. Because RF sensing may be performed in the same frequency bands as communication, hardware may be utilized for both communication and RF sensing. For example, one or more of the components of the RF sensing system 105 shown in FIG. 1 may be included in a wireless modem (e.g., Wi-Fi or 5G modem) of a wireless device, such as a Wi-Fi access point. That said, embodiments may utilize an RF sensing system 105 independent of any such communication means. As noted, for example, some embodiments may utilize UWB transceivers. Techniques for RF sensing described may utilize various types of RF signals 112, such as Zadoff sequences, Orthogonal Frequency-Division Multiplexing (OFDM) Long Training Field (LTF)-like symbols for channel capture to determine the presence and/or movement of the object 110. Because the RF sensing system may be capable of sending RF signals for communication (e.g., using 802.11 communication technology), embodiments may leverage channel estimation used in communication for performing RF sensing as provided herein. Accordingly, RF signals 112 may comprise the same wireless pulses and/or packets as those used for channel estimation in communication.

Additionally, different bandwidths may be used for RF sensing, depending on desired functionality. Generally speaking, performance (accuracy of human identification) may be better with increased bandwidth. In Wi-Fi, for example, bandwidth may be 40 MHz, 80 MHz, 160 MHz, or 320 MHz, in accordance with applicable standards. In some embodiments, fewer than all tones (or subcarriers) may be used in a frequency band. For example, an embodiment may use half of all tones in an available 80 MHz frequency band by utilizing every other tone. In this case, although resolution may be impacted, effective bandwidth for time-of-flight (ToF) measurements would be 80 MHz. The use of additional antennas can provide increased performance in a similar manner, where more antennas generally provide better accuracy (e.g., increased angular resolution).

Figure 2A:
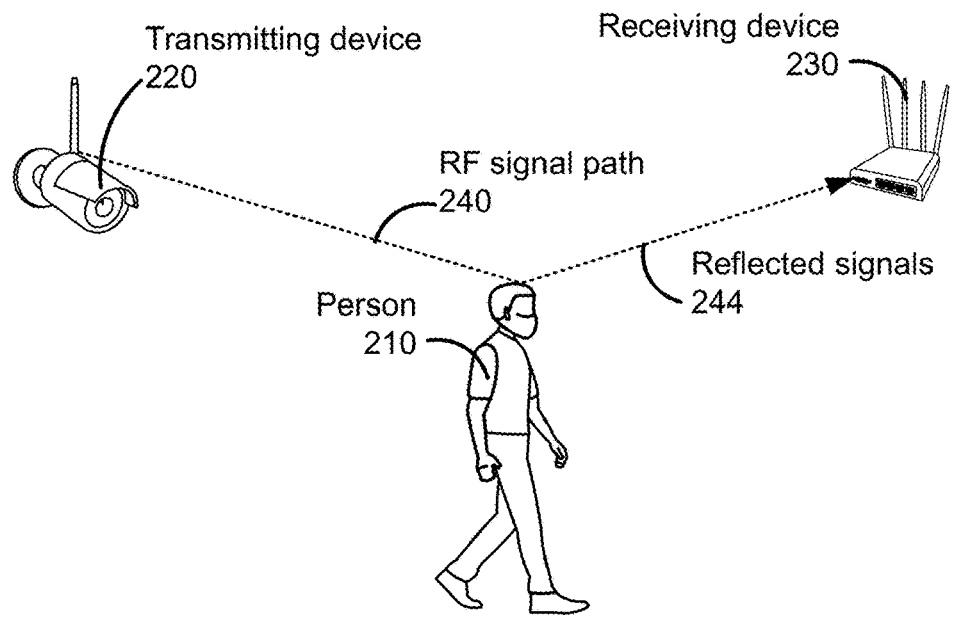
FIGS. 2A and 2B are diagrams illustrating configurations with which RF sensing may be performed, according to some embodiments.
Figure 2B:
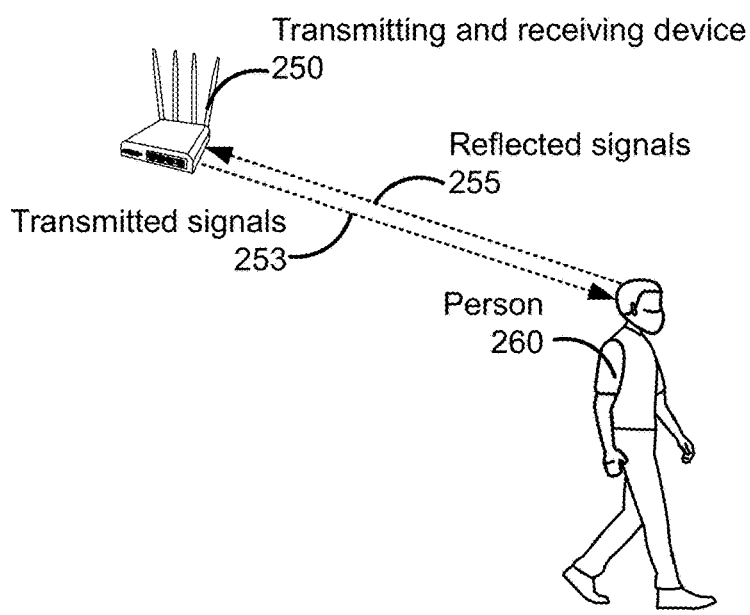

Illustrations showing configurations in which an RF sensing system 105 may be used in human identification are provided in FIGS. 2A-2B.

FIG. 2A is a simplified diagram illustrating how identification of a person 210 using RF sensing may be performed using two wireless devices: a transmitting device 220, and a receiving device 230. Here, the transmitting device 220 (which may comprise some or all components of an RF sensing system, such as the RF sensing system of FIG. 1) may transmit RF signals, the reflections of which (reflected signals 244) are received by the receiving device 230 (which also may comprise some or all components of an RF sensing system). A processor, computer, or device communicatively coupled with the transmitting device 220 and receiving device 230 (including a processor of the transmitting device 220 or receiving device 230) may coordinate the timing of the transmittal and receipt of the RF signals. (The transmitting device 220 and receiving device 230 may be communicatively linked with a communication network, such as a WLAN, 5G cellular network, or combination thereof.) Additionally or alternatively, there may be no coordination of RF between transmitting device 220 and receiving device 230, in which case RF sensing may be performed opportunistically. In such embodiments, transmitting device 220 may transmit RF signals over the course of normal operation (e.g., in which RF signals may be used for communication to the receiving device 230 and/or other wireless devices), and RF signals received by the receiving device 230 may be used for RF sensing. Portions of the RF signals that travel along the RF signal path 240 reflect off the person 210. As previously noted, these reflected signals 244 may be identified in the captured CSI and used to determine a shape and motion of the person 210, which can be used for human identification.

We can be noted that alternative embodiments may comprise different configurations. For example, FIG. 2B illustrates a variation to the configuration in FIG. 2A in which a single transmitting and receiving device 250 is set up to detect the person 260 in a monostatic configuration, where the transmitting and receiving device 250 both transmits the transmitted signals 253 and receives the corresponding reflected signals 255. Alternative configurations may include any number of variations to the configurations and FIGS. 2A and 2B. Variations may include, for example, configurations with more than two devices (e.g., multi-static), devices used in a bistatic configuration to both transmit and receive RF signals, devices used in both bistatic and monostatic configurations, a "one to many" configuration in which a single transmitting device may transmit RF signals received by multiple receiving devices, a "many to one" configuration in which signals from multiple transceivers are received by a single receiving device, "many to many" configurations in which multiple devices may be transmitting and receiving RF signals to and from multiple devices, and any combination thereof. Although the devices of FIG. 2A illustrates a Wi-Fi access point and security camera, any combination of device types may be used, including multiple devices of a single type, devices of other (not shown) types, etc. Devices may include, for example, Internet of things (IoT) devices, wireless sensors, security devices, special/proprietary RF sensing devices, etc., or any combination thereof.

Returning to the example of FIG. 2A, in an embodiment implemented using Wi-Fi wireless technology, a procedure for human identification may proceed as follows. First, the transmitting device 220 may transmit Wi-Fi frames and the receiving device 230 may capture channel state information (CSI) for every frame. Each frame may be sent over K frequencies or subcarriers and may be received by an antenna array (M antennas) at the receiving device 230, to provide range and angle information needed to recognize the shape of a person. A range-angle profile may then be computed for each CSI sample which represents the direct path signal from transmitter to receiver and all reflected path signals including those reflected from the 210. This range-angle profile may then be used for shape recognition.

Figure 3:
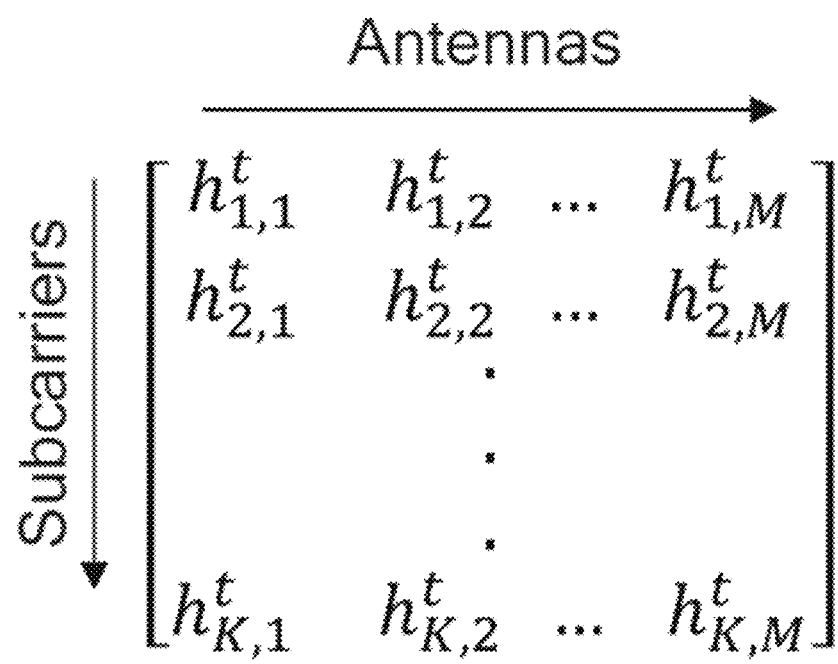
FIG. 3 is an illustration of a matrix representing CSI information gathered over time, according to an embodiment.

CSI samples also maybe captured over time with the rate of Fs CSI samples per second to provide velocity information needed to recognize the walking or gait of the person. A matrix illustrating how CSI data over time may be represented in this manner is illustrated in FIG. 3, where CSI at frequency i, at antenna j, and time t is represented by $h_{ij}^{t}$. A Doppler Frequency Shift (DFS) profile may then be computed for CSI samples over time which represents the velocity of different body parts of the person. This profile then may be used for gait recognition. The combination of gait recognition and shape recognition we then be used to identify the person collectively.

Gait recognition can be helpful tool for in human identification. This is because people generally have different walking patterns or gaits. For instance, the movement of a person's torso over time may have different patterns over time as they walk, or their limbs may move with different patterns as they walk. The movements in the environment (e.g., a person walking) because a DFS in CSI samples over time, which depends on the velocity of the movement. Because different body parts may move with different velocities, they will generate different doppler frequency shifts when the signal gets reflected off the person. These doppler frequency shifts collectively represent the movement of different body parts when the person is walking, in may be used in the aggregate to construct a DFS profile for a person over time.

Figure 4:
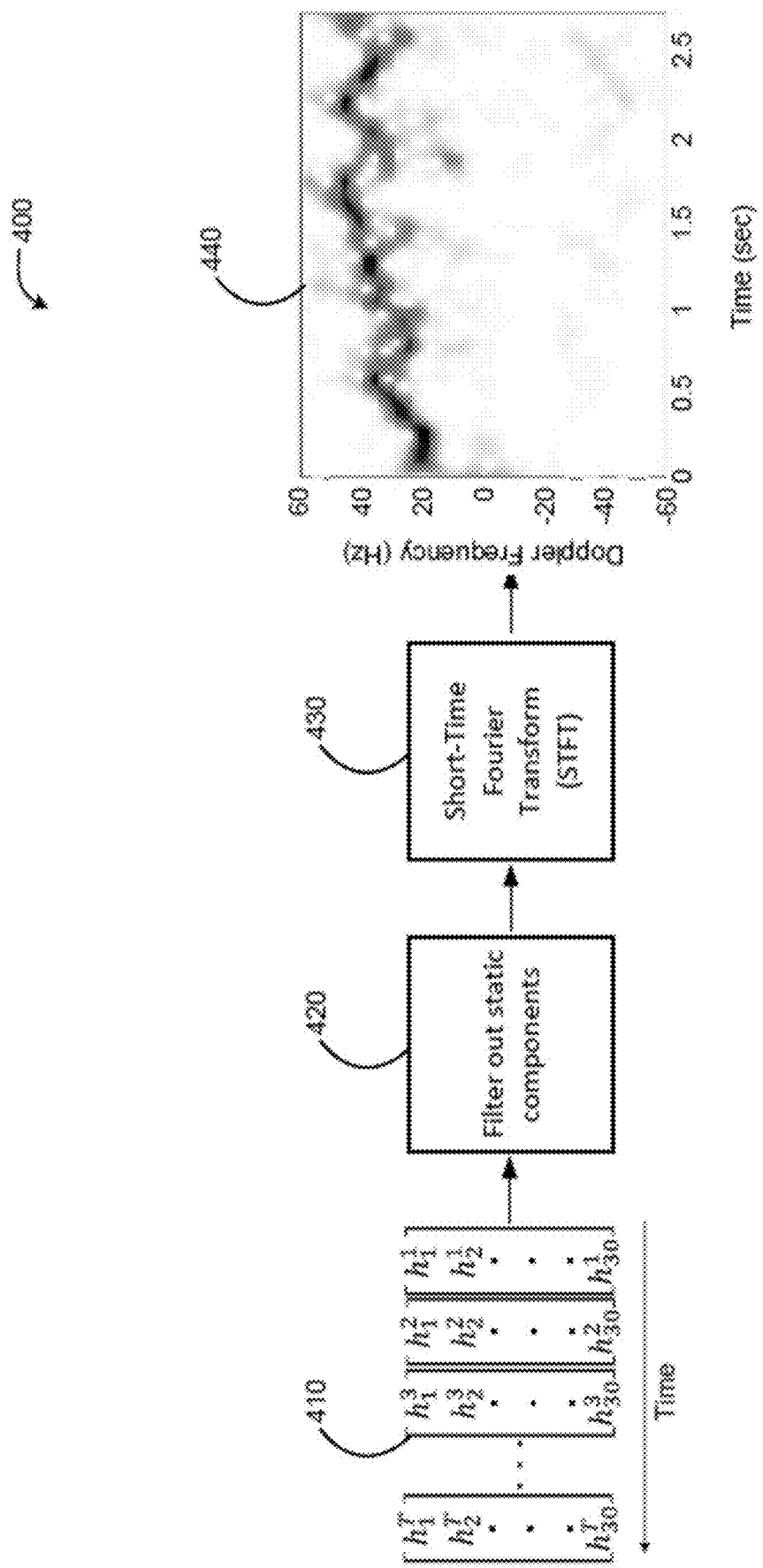
FIG. 4 a graph illustrating a process by which a Doppler frequency shift (DFS) profile may be generated, according to an embodiment.

FIG. 4 is a graph illustrating a process 400 by which a DFS profile may be generated, according to an embodiment. Here, CSI is sampled over time, as illustrated at CSI data 410, as described in the previous embodiment. Build a DFS profile for gait recognition, the time window over which CSI is sampled may be long enough to capture a full gait cycle. As an example, the time window may comprise a 2-3 second window during which CSI sample. The sampling rate, too, may vary, depending on desired functionality. Because faster CSI sampling rates capture faster motions, the accuracy of gait recognition may generally increase with a higher CSI sampling rate (e.g., to capture more motions that may be used to uniquely identify an individual). This is counterbalanced with the fact that higher CSI sampling rates generate larger amounts of data, which may require more processing power to process. As an example, a CSI sampling rate of approximately one CSI sample per millisecond may be sufficient to capture enough movement data to results in accurate gait recognition. Some embodiments may have a faster sampling rate (e.g., 500 µs or faster) to capture faster movements, and other embodiments may implement a slower sampling rate (e.g., one CSI sample every 20-30 ms) to capture slower movements (e.g., a breathing rate of the person).

As illustrated at block 420, CSI data 410 may be processed to filter out static components, i.e., to remove signals that are generated by static reflectors such as walls, floor, ceiling, furniture, etc. According to some embodiments, for example, this filtering may comprise filtering out low frequency components indicative of movements below a threshold value, or averaging over a short-time Fourier transform (STFT) window and removing the average. An STFT may then be performed on the filtered data, as indicated at block 430, to produce DFS data 440.

The time window of the STFT can be set using different approaches, depending on desired functionality. For example, reducing a time window can increase the precision of a time at which motion is detected, but the speed of the motion (e.g., frequency) may be relatively difficult to identify. On the other hand, increasing the time window allows the speed of the motion (e.g., frequency) to be estimated more precisely but the precision of a time at which motion is detected may be less precise. Thus, for detection of human motion, time window may be selected to achieve good analysis (detected time and speed) of such human motion. According to some embodiments in which CSI is sampled every 1 ms, a STFT window size of approximately 300 ms may be used. Other embodiments may use longer or shorter windows, as desired, in view of the previously-described tradeoffs. In addition or as an alternative to STFT, some embodiments may use wavelet transform, in which short time windows (e.g., 100 ms) are used at high frequencies and long time windows (e.g., 500 ms) are used at low frequencies.

As previously indicated, DFS data for an individual may be collected over time to build a DFS profile that represents the walking pattern of the individual, which may then be used to perform gait recognition.

Figure 5A:
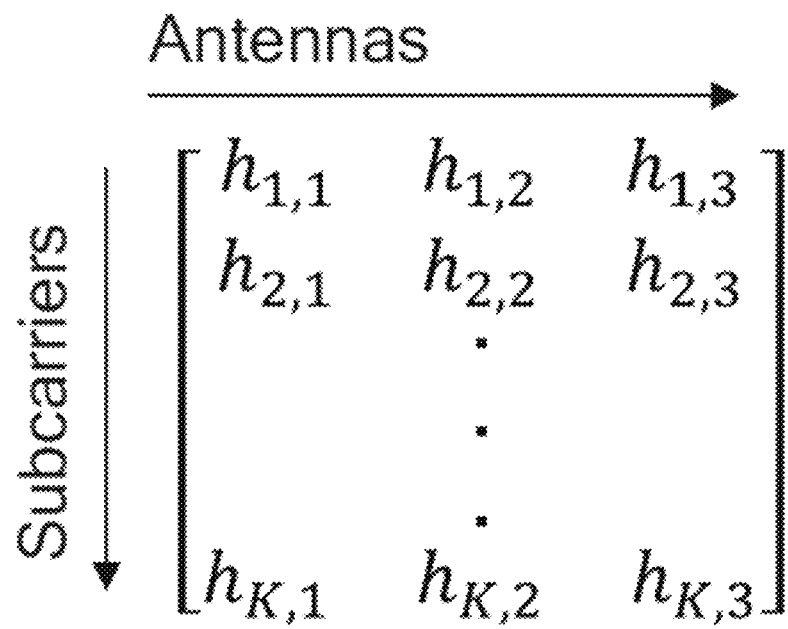
FIG. 5A is an illustration of a matrix representing angle-range CSI information, according to an embodiment.

As noted, shape recognition may be derived from angle and range information obtained from CSI data. In particular, CSI data obtained from RF reflections from a person (which may comprise the same CSI data used for gait recognition) may be processed to determine an angle of arrival (AoA) and ToF of reflections. ToF, for example, can be estimated from CSI data across multiple subcarriers and antennas (e.g., as illustrated in the matrix of FIG. 5A) by using a Fourier transform over subcarriers with subcarrier spacing as follows:

$$P(R) = \left| \sum_{i=1}^{K} h_i e^{j\frac{2\pi i \Delta f R}{c}} \right|, \quad (1)$$

where R is range, $\Delta f$ is the subcarrier frequency spacing, c is the speed of light, i is the subcarrier index, K is the total number of subcarriers, and $h_i$ is the CSI data on subcarrier i.

Figure 5B:
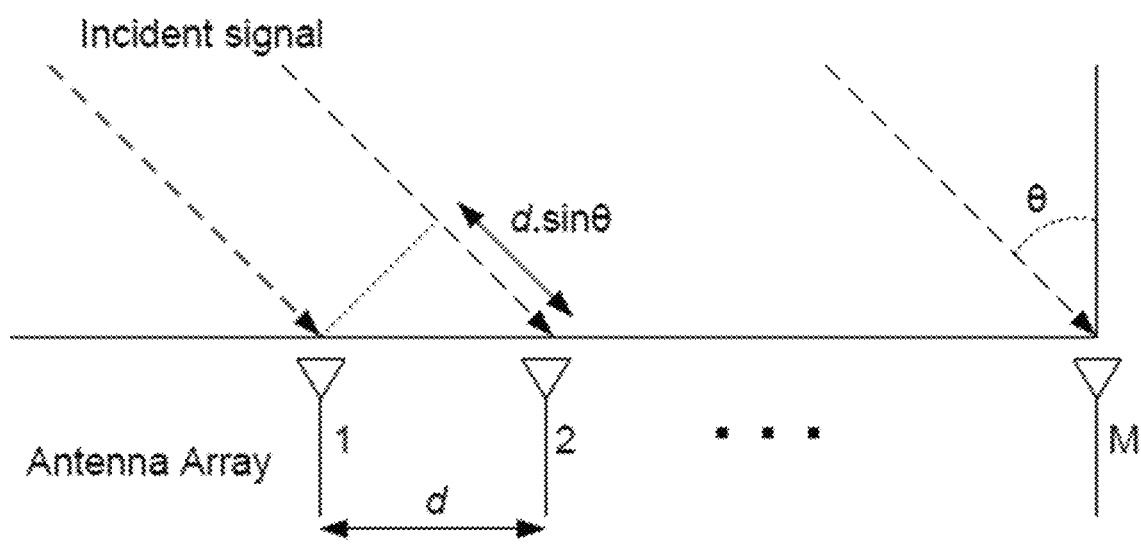
FIG. 5B is a diagram illustrating various geometric features that may be used when determining an angle of arrival (AoA) of an RF signal incident on an antenna array, according to an embodiment.

AoA can be measured using geometric values for angle of incidence, $\theta$, and distance between antennas, d, (e.g., as illustrated in FIG. 5B) using a Fourier transform over spatially-separated antennas, as follows:

$$P(\theta) = \left| \sum_{i=1}^{M} h_i e^{j\frac{2\pi i d \sin\theta}{\lambda}} \right|, \quad (2)$$

where $\lambda$ is wavelength of the radio signal, i is the antenna index, M is the total number of antennas, and $h_i$ is the CSI data on antenna i.

According to some embodiments, an angle-range profile (e.g., AoA-ToF profile) may be obtained by processing the CSI data by combining equations (1) and (2) in a two-dimensional (2D) fast Fourier transform (FFT) over both antennas and subcarriers, as follows:

$$P(\theta, R) = \sum_{i=1}^{M} \sum_{k=1}^{K} h_{ik} e^{j\frac{2\pi i d \sin\theta}{\lambda}} e^{j\frac{2\pi R k \Delta f}{c}}. \quad (3)$$

Because the resulting angle-range profile may include random ToF shifts, embodiments may employ correction to remove the random ToF from the angle-range profile. A description of how this can be done is provided with respect to FIGS. 6A-6D.

Figure 6B:
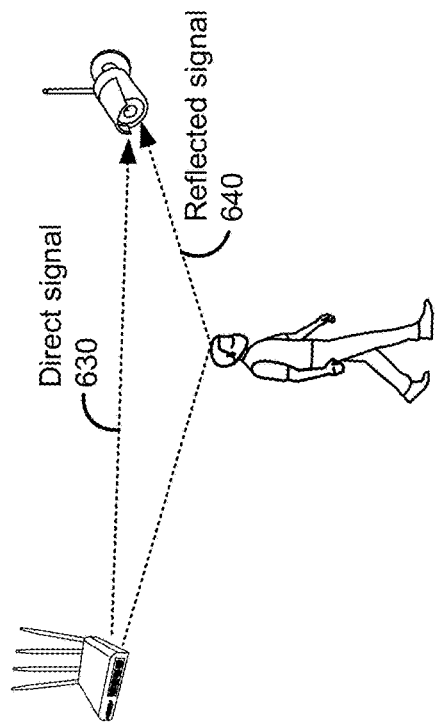
FIGS. 6A-6D are a series of illustrations showing how random ToF shifting in angle-range CSI data can be corrected, according to some embodiments.
Figure 6D:
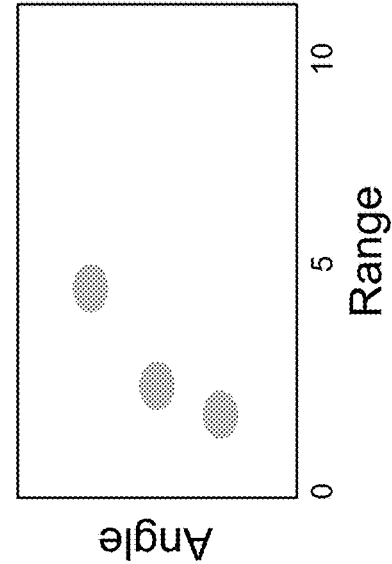
Figure 6A:
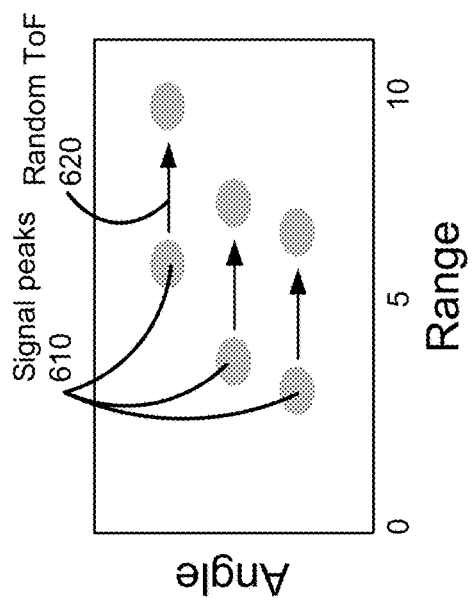

FIG. 6A illustrates the problem of random ToF shifting. Here, in CSI comprising angle and range data, signal peaks 610 (e.g., indicating different signal paths) experience a random ToF shift 620 due to the issue of random timing (e.g., unsynchronized RF signal transmissions, timing inaccuracies, etc.) between transmitting and receiving devices. Because the magnitude of the shift is random and unknown, it may be unclear what the true range of the signal peaks 610 would be.

Figure 6C:
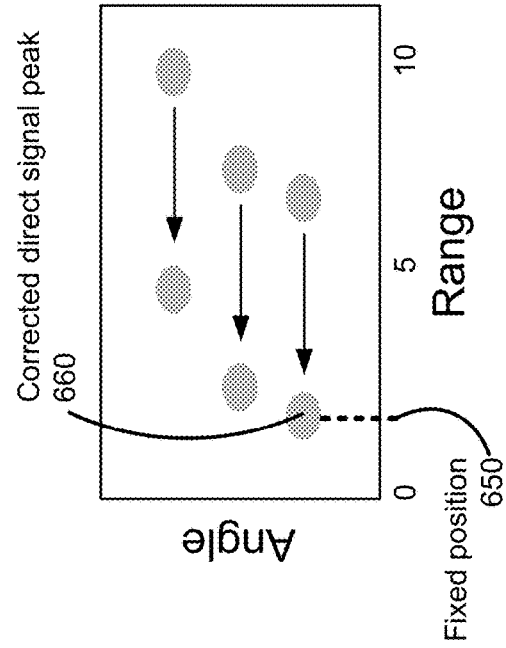

This can be corrected, however, by using a direct signal as a point of reference. As illustrated in FIG. 6B, for example, a direct signal 630 between the transmitting device and receiving device can be used as a reference point from which the reflected signal 640 can be measured. Because the signal peak corresponding to the direct signals 630 is received before the reflected signal 640 (and any other reflections), it may be identified in the angle-range data. FIG. 6C illustrates how this reference can impact the angle-range data. Specifically, the reference point derived from the direct signal 630 can provide a fixed position 650 to which the peak(s) of the direct signals 630 may be shifted (e.g., corrected direct signal peak 660). Indirect signal peaks may be shifted by the same amount, preserving their range relative to the direct signal peak. The resulting angle-range data, shown in FIG. 6D, can be used for shape recognition.

In FIGS. 6A-6D angle and range data include signal peaks 610, which signify a simplified representation of signal data received by one or more receivers in an RF sensing configuration. In practice, angle-range data can be more complex, including angle-range data representing more nuanced detail of the shape of a detected person, including torso, head, arms, legs, etc. As such, the resulting angle-range data can be used to construct the body shape of a detected person. According to some embodiments, angle-range data may be collected from multiple frames and at multiple angles to gather sufficient information to build an angle-range profile of a detected person (e.g., reconstruction of a full-body or near-full-body shape) capable of use for identification.

It also can be noted that, although a location of the fixed position 650 is known in the example in FIG. 6C, embodiments are not so limited. That is, in some embodiments, a fixed position may be derived from a known distance between transmitting and receiving devices, but in other embodiments the distance between transmitting and receiving devices may not be known. In such instances, the corrected direct signal peak may not correspond with a particular range between transmitting and receiving devices, but may instead be used as a reference point from which other signal peaks (e.g., from reflected signal 640 and other reflections) may be measured. Thus, shape recognition may be performed whether or not the distance between transmitting and receiving devices is known. CSI data may therefore be independent of a particular configuration, and therefore CSI data gathered using different configurations may be used to train a single machine learning architecture for human identification, CSI data from one configuration used to train a machine learning architecture may be used to process CSI in another configuration for human identification, and so forth.

Figure 7:
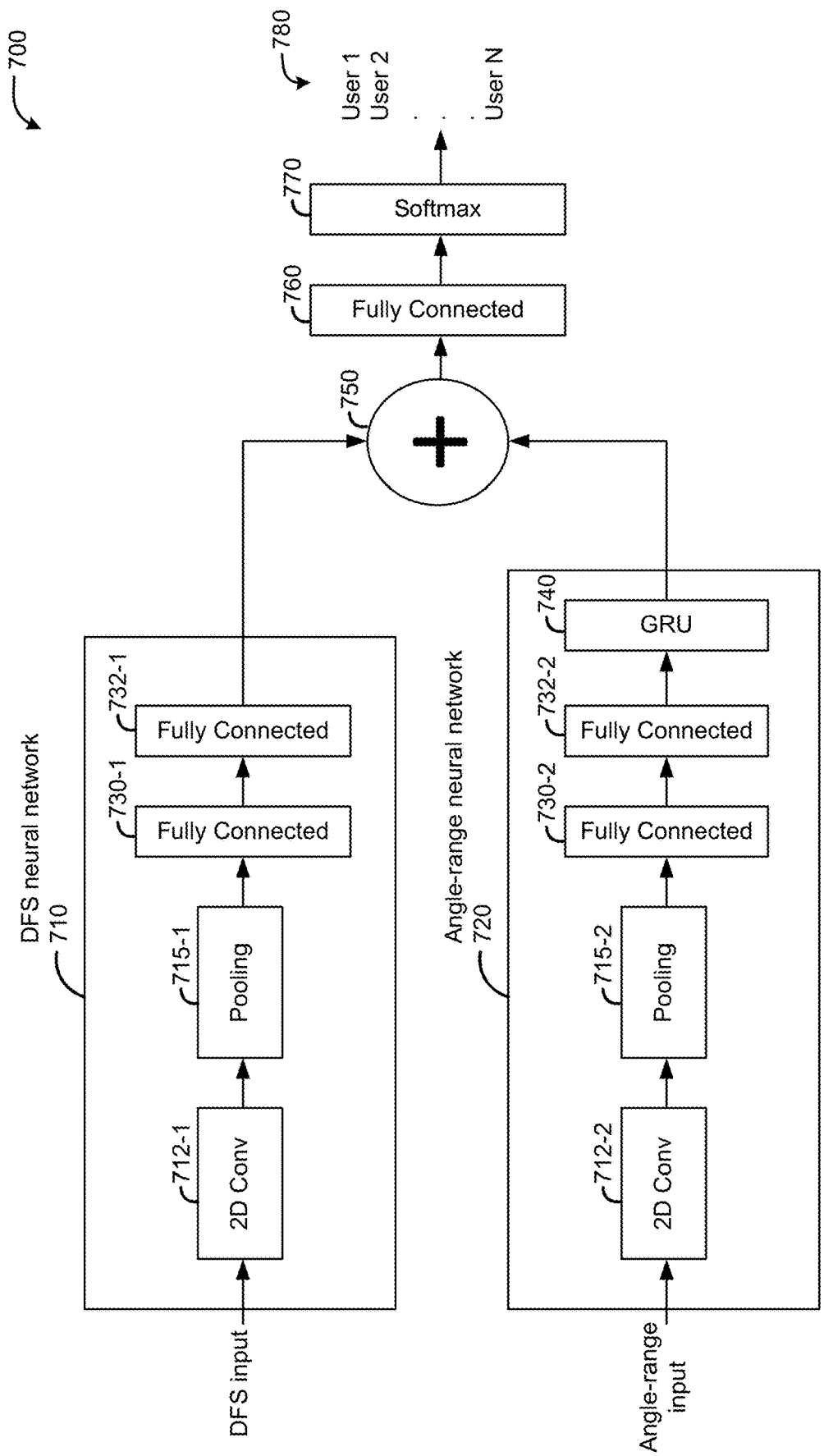
FIG. 7 is an illustration of an enhanced human identification system that implements machine learning to identify a person based CSI input, according to an embodiment.

FIG. 7 is an illustration of an enhanced human identification system 700 that implements machine learning to identify a person based on DFS input (e.g., as produced using the process described with respect to FIG. 4) and angle-range input (e.g., as produced using the processes described with respect to FIGS. 5A-6D). Although a particular architecture is illustrated with respect to the enhanced human identification system 700 and subcomponents (e.g., DFS neural network 710 and angle-range neural network 720), alternative embodiments may implement additional or alternative machine learning models/architectures. The enhanced human identification system 700 may be executed by software and/or hardware components of an electronic device, such as a device receiving CSI data (e.g., receiving device 230 or transmitting and receiving device 250) or a device (e.g., computer) in communication therewith. Example software and hardware components are provided in FIG. 10, which is discussed in more detail hereafter.

As illustrated in FIG. 7, DFS input and angle-range input may be provided to DFS neural network 710 and angle-range neural network 720, respectively. The DFS neural network 710 and angle-range neural network 720 may then implement similar operations (as indicated in FIG. 7) on the input data. In particular, each neural network may respectively perform 2D convolution 712-1, 712-2 of respective input data, followed by pooling 720-1, 712-2 to reduce/condense data. Pooled data can then be processed using a first fully-connected layer 730-1, 730-2 and second fully-connected layer 732-1, 732-2, as illustrated. In the case of the DFS neural network 710, the output of the second fully connected layer 732-1 may comprise the output classification of the DFS neural network 710. In the case of the angle-range neural network 720, data may be further processed by a gated recurrent unit (GRU) 740 for classification.

As previously noted, embodiments herein utilize a combination of gait recognition and shape recognition for enhanced identification capabilities. As such, the enhanced human identification system 700 combines the gait recognition output by the DFS neural network 710 with the shape recognition output by the angle-range neural network 720 using an adding function 750. The decision-level algorithms used to combine these outputs may vary, depending on desired functionality. As illustrated, the output may be provided to another neural network comprising a fully connected layer 760 followed by a softmax function 770 to provide an output 780 comprising a probability distribution of possible individuals (User 1 to User N) detected from the DFS/angle-range inputs. Identification of a particular individual may occur in this case, for example, if a probability for the particular individual exceeds a threshold value. Alternative decision-level algorithms may include identifying a particular individual if both the DFS neural network 710 and angle-range neural network 720 identify the particular individual with a confidence level above a threshold. Different embodiments may weight the output of each neural network differently, which may be dynamic, based on different circumstances (e.g., the output of the DFS neural network 710 may be given more weight if a detected individual is determined to be walking, for example).

Training of the neural networks in the enhanced human identification system 700 and/or other machine learning architectures used for gait recognition and shape recognition may be based on a data set of relevant DFS and angle-range data for individuals to be identified. According to some embodiments, training data for a particular person may be captured and manually associated with the person. Additionally or alternatively, automatic mechanisms for associating training data with a particular person may be used, which may be based on other sensor data and/or another data source capable of verifying a person's identity. In a first example, a configuration in which CSI data may be collected along with video data (e.g., in a configuration similar to FIG. 2A) may be used during together with CSI data of an individual while also identifying the individual using video (e.g., using facial recognition from video images). In a second example, CSI data may be collected near a turnstile or other security access point where an individual provides identification information (e.g., an identifying access card, fob, or other token) before walking through the area in which CSI data is collected. Devices or systems collecting identification of the individual and the CSI data may provide this information to the enhanced human identification system 700 as training data for training the enhanced human identification system 700 to identify the individual. In either case, these configurations may be set up in a building or other location where the enhanced human identification system 700 will be used for human identification during a training period. Once the enhanced human identification system 700 (or other machine learning architecture using gait and shape recognition) is trained, a DFS and angle-range profile (as previously described) is effectively established, and separate identification mechanisms (e.g., a camera or security access point) may be no longer needed.

As noted, training may use multiple CSI data captures per individual to build up adequate information regarding the individual's gait and shape for identification purposes. Furthermore, updating of a system comprising a machine learning architecture implementing gait and shape recognition may be ongoing. A positive identification of an individual (e.g., above a threshold) may, for example, be used as training data for the system, allowing the machine learning architecture to use new data to help ensure individuals are recognized as individuals' shapes and gaits change over time.

Figure 8:
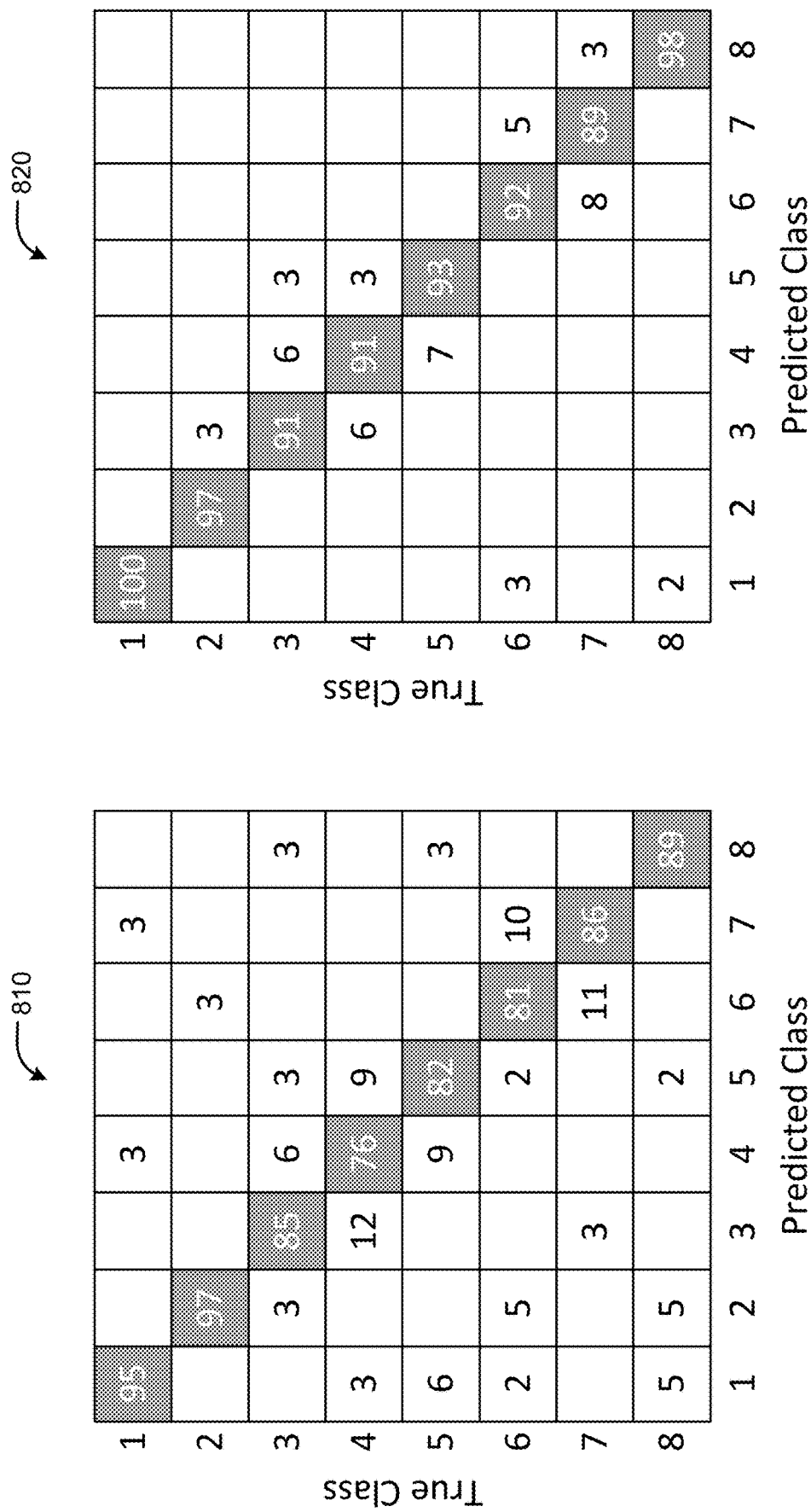
FIG. 8 is a figure of two graphs illustrating experimental results of a system using combined gait and shape recognition compared with a system using gait recognition only.

FIG. 8 is a figure illustrating experimental results of using combined gait and shape recognition in the manner described herein compared with a system using gait recognition only, using an experimental data set from a group of eight people. Ages of the group were between 20-28 years old, their weights where between 44-75 kg, and their heights were between 155-186 cm. CSI data was collected in a 4 m×4 m room with one transmitter and two receivers using a 30-tone CSI (40 MHz) bandwidth and three antennas. 200 CSI captures were taken of each person, where each capture lasted from 2 to 3 seconds, and CSI was captured at a rate of one CSI sample per millisecond. For each person, 80% of the captures were used for training, and 20% of the captures were used for testing.

The left-hand graph 810 illustrates the accuracy of a system implementing gait recognition only. The accuracy of the system in predicting each individual is illustrated in the gray boxes where the predicting class matches the true class. As can be seen, the accuracy ranges from 81%-97%, with the average being 87%.

The right-hand graph 820 illustrates the accuracy of a system implementing a hybrid gait recognition and shape recognition as described herein. As can be seen, the accuracy exceeds the accuracy of system using the gait recognition only. In the right-hand graph 820, the accuracy ranges 89%-100%, with the average being 94%. The use of shape recognition can therefore complement gait recognition, and the embodiments herein for utilizing both shape and gait recognition can provide human identification with greater accuracy than with gait recognition alone.

Figure 9:
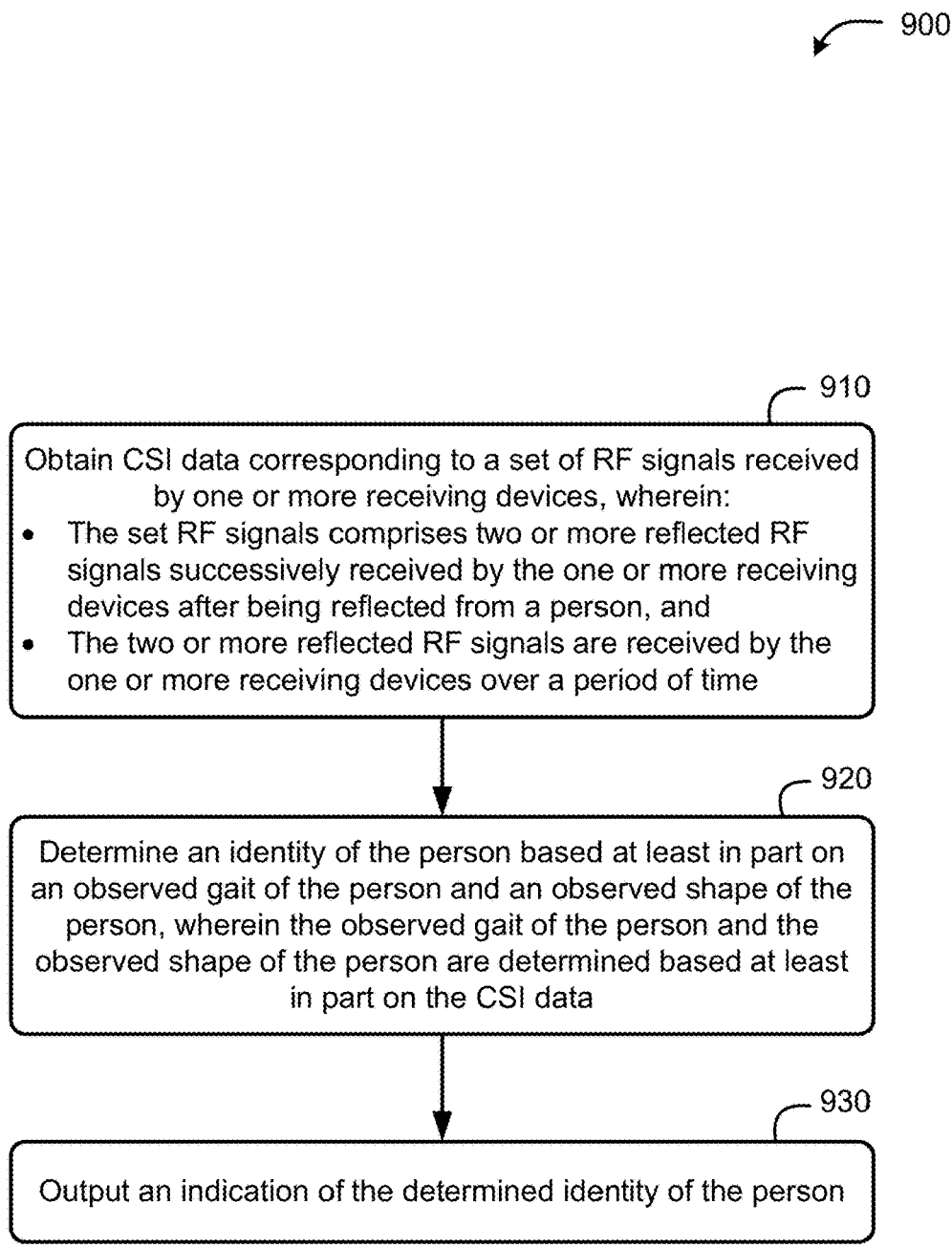
FIG. 9 is a flowchart illustrating a method of RF sensing for human identification, according to an embodiment.

FIG. 9 is a flowchart illustrating a method 900 of RF sensing for human identification, according to an embodiment. As with other figures provided herein, FIG. 9 is provided as a non-limiting example. Alternative embodiments may add, omit, rearrange, and/or otherwise alter the operations illustrated in FIG. 9. Moreover, although the method 900 is described below with regard to detection of a person, alternative embodiments may employ similar processes to detect non-human objects, including pets, robots, motorized devices, or any combination thereof. One or more operations of the blocks illustrated in FIG. 9 may be performed by an RF sensing system, such as the one illustrated in FIG. 1, which can be used in one or more wireless devices (e.g., transmitting and/or receiving devices) as illustrated in FIGS. 2A and 2B, for example. Additionally or alternatively, the implementation of the process illustrated in FIG. 9 may be performed by a receiving device (e.g., one of the one or more receiving devices of block 910) and/or a computing system communicatively connected therewith. Components of an example computing system are illustrated in FIG. 10 and described hereafter. Additionally, it can be noted that although the description herein describes the detection of "a person" embodiments are not so limited. According to some embodiments, multiple people and/or objects of multiple object types may be detected and/or identified using the techniques provided herein.

The functionality at block 910 comprises obtaining CSI data corresponding to a set of RF signals received by one or more receiving devices, wherein the set RF signals comprises two or more reflected RF signals successively received by the one or more receiving devices after being reflected from a person, and the two or more reflected RF signals are received by the one or more receiving devices over a period of time (e.g., during which the person is walking). As previously indicated, a period of time during which the person is walking may comprise a time window of 2-3 seconds, for example, during which CSI information regarding the person is gathered (e.g., via the reflected RF signals). RF signals may be successively received at approximately the sample rate of the CSI. As noted, sample rates may vary between one sample every 500 μs to one sample every 30 ms, for example. Other embodiments may utilize faster or slower sampling rates, depending on desired functionality.

The functionality at block 910 may vary, depending on which device is performing the functionality. For example, as noted, the functionality may be performed by a receiving device, in which case obtaining CSI data may comprise measuring the set of RF signals with the receiving device. If the functionality is performed by a separate device, which may be in communication with the receiving device via wired and/or wireless communication, as well as via a communication network, cloud, Internet, or a combination thereof, for example. If performed by a separate device, for example, obtaining the CSI data may comprise receiving the CSI data (and/or underlying measurement data) from the one or more receiving devices.

As previously discussed, RF signals may be transmitted and received using different technologies and different configurations. In some embodiments, for example, the RF signals received by the one or more receiving devices at block 910 may comprise one or more WLAN signals, one or more Bluetooth signals, one or more UWB signals, or one or more cellular signals, or a combination thereof. A WLAN signal may comprise a Wi-Fi signal, for example. A cellular signal may comprise a 4G LTE signal, 5G New Radio (NR) signal, or a combination thereof, for example. Additionally or alternatively, embodiments may include a bistatic configuration, in which case the one or more receiving devices may comprise a transmitting device that transmits the set of RF signals. In some embodiments, a transmitting device, separate from the one or more receiving devices, may transmit the set of RF signals. Again embodiments may utilize any number of various configurations (e.g., one-to-many transmissions, many-to-one transmissions, etc.).

Means for performing the functionality of block 910 may comprise processor(s) 1010, bus 1005, working memory 1035, communications subsystem 1030, wireless communications interface 1033, RF sensing system 105, and/or other components of a computer system as illustrated in FIG. 10 and described hereinafter. Additional means may include Rx antenna(s) 120, Rx processing circuitry 145, Mux 135, processor 125, memory 130, and/or other components of an RF sensing system 105 as illustrated in FIG. 1 and previously described.

At block 920, the functionality comprises determining an identity of the person based at least in part on an observed gait of the person and an observed shape of the person, wherein the observed gait of the person and the observed shape of the person are determined based at least in part on the CSI data. As noted, observed shape of a person may be determined on angle-range data obtained using techniques as previously discussed with regard to FIGS. 5A-6D. The observed shape of the person may be determined using ToF information and AoA information obtained from the CSI. According to some embodiments, this may comprise removing random ToF shift by utilizing a direct signal as a reference point. As such, according to some embodiments of the method 900, the set of RF signals may further comprise at least one direct path RF signal that does not reflect from the person. In such embodiments, the observed shape of the person may be determined using CSI data corresponding to the direct path RF signal and the two or more reflected RF signals. As also noted, the observed gait of the person may be determined using Doppler Frequency Shift (DFS) obtained from the CSI.

As previously described (e.g., in relation to FIG. 7), human identification may be based on classification by a neural network based on CSI input. Thus, according to some embodiments of the method 900, determining the identity of the person based at least in part on the observed gait of the person and the observed shape of the person may comprise processing DFS obtained from the CSI with a first neural network to perform gait recognition of the person, and processing ToF and AoA information obtained from the CSI with a second neural network to perform shape recognition of the person. Each neural network may have different subcomponents, as described with respect to FIG. 7, including operations such as 2D convolution, pooling, processing using fully connected neural network layers, and a GRU. These neural networks may perform gait recognition and shape recognition separately (e.g., based on DFS and angle-range information obtained from the same CSI data), in which case the outputs of these neural networks may be combined to provide a more accurate identification of the person. As such, according to some embodiments, determining the identity of the person based at least in part on the observed gait of the person and the observed shape of the person may further comprise combining an output of the gait recognition with an output of the shape recognition. In some embodiments, this combination may be performed using an additional neural network and softmax function, for example.

Means for performing the functionality of block 920 may comprise processor(s) 1010, bus 1005, working memory 1035, communications subsystem 1030, wireless communications interface 1033, RF sensing system 105, and/or other components of a computer system as illustrated in FIG. 10 and described hereinafter. Additional means may include processor 125, memory 130, and/or other components of an RF sensing system 105 as illustrated in FIG. 1 and previously described.

At block 930, the functionality comprises outputting an indication of the determined identity of the person. That is, once an identity of the person has been determined, the indication of the determined identity may be provided using any of a variety of techniques, which may vary based on application. Software and/or hardware executing the functionality of the method 900 may, for example, provide the indication of the determined identity to a separate application layer of a device. A device executing the functionality of method 900 may communicate the determined identity to another device, a user, a remote system, etc. Thus, according to some embodiments of the method 900, outputting an indication of the determined identity of the person may comprise providing the indication of the determined identity with a user interface, sending the indication of the determined identity to a device, or providing the indication of the determined identity to an application layer of a device, or a combination thereof.

Means for performing the functionality of block 930 may comprise processor(s) 1010, bus 1005, output device(s) 1020, working memory 1035, communications subsystem 1030, wireless communications interface 1033, RF sensing system 105, and/or other components of a computer system as illustrated in FIG. 10 and described hereinafter. Additional means may include processor 125, memory 130, and/or other components of an RF sensing system 105 as illustrated in FIG. 1 and previously described.

FIG. 10 is a block diagram of an embodiment of a computing system 1000, which may incorporate an RF sensing system 105 that can be operated in the manner discussed in the previously-described embodiments. As noted, an RF sensing system 105 may be included in each of one or more transceivers, which may be incorporated into one or more subsystems of the computing system 1000, such as the wireless communications interface 1033. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be located at different physical locations.

The computing system 1000 is shown comprising hardware elements that can be electrically coupled via a bus 1005 (or may otherwise be in communication, as appropriate). The hardware elements may include processor(s) 1010, which can include without limitation one or more general-purpose processors, one or more special-purpose processors (such as a DSP, graphics processing unit (GPU), application-specific integrated circuit (ASIC), field-programmable gate array (FPGA), and/or the like), and/or other processing structure or processing unit, which can be configured to perform one or more of the methods described herein, including the method described in relation to FIG. 9 and/or the processes described in relation to FIGS. 1-8. The computing system 1000 also can include one or more input devices 1015, which can include without limitation a mouse, a keyboard, a camera, a microphone, a touchscreen, sensor, etc., or any combination thereof; and one or more output devices 1020, which can include without limitation a display device, a speaker, etc., or any combination thereof.

The computing system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device (such as a random access memory (RAM) and/or a read-only memory (ROM)), which can be programmable, flash-updateable, and/or the like. Such storage devices may be configured to implement any appropriate data stores, including without limitation, various file systems, database structures, and/or the like.

The computing system 1000 may also include a communications subsystem 1030, which can include support of wireline communication technologies and/or wireless communication technologies (in some embodiments) managed and controlled by a wireless communication interface 1033. The communications subsystem 1030 may include a modem, a network card (wireless or wired), an infrared communication device, a wireless communication device, and/or a chipset, and/or the like. The communications subsystem 1030 may include one or more input and/or output communication interfaces, such as the wireless communication interface 1033, to permit data and signaling to be exchanged with a network, mobile devices, other computer systems, and/or any other electronic devices described herein. As previously noted, an RF sensing system 105 (as illustrated in FIG. 1) may be incorporated into a wireless communications interface 1033 such that Tx antenna(s) 115 and Rx antenna(s) 120, and the circuitry connected with the antenna elements (e.g., the other components of the RF sensing system 105), may be used for both RF sensing and data communication. For example, in some embodiments, the wireless communication interface 1033 may comprise an 802.11ad-compatible and/or 802.11ay-compatible modem capable of both RF sensing and data communication. More broadly, the wireless communications interface 1033 may comprise one or more transceivers having one or more wireless radios capable of transmitting and receiving RF signals using a WLAN standard (e.g., IEEE 802.11/Wi-Fi), and may be used for WLAN communication, in addition to RF sensing. RF signals may comprise communication packets utilized by the WLAN standard. As previously noted, embodiments herein may leverage existing techniques for channel estimation to obtain CSI to use for RF sensing. Additionally or alternatively, the one or more transceivers may comprise UWB transceivers.

As noted, some embodiments may have an RF sensing system 105 that is not used for wireless communication. In such instances, the RF sensing system 105 may be incorporated elsewhere within the computing system 1000. In some embodiments, for example, the RF sensing system 105 may be incorporated into the computing system 1000 as an input device 1015. Other sensors, too, may be included as input devices 1015.

In many embodiments, the computing system 1000 will further comprise a working memory 1035, which can include a RAM and/or or ROM device. Software elements, shown as being located within the working memory 1035, can include an operating system 1040, device drivers, executable libraries, and/or other code, such as application(s) 1045, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 9, may be implemented as code and/or instructions that are stored (e.g. temporarily) in working memory 1035 and are executable by a computer (and/or a processor within a computer such as processor(s) 1010); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computing system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computing system 1000 and/or might take the form of source and/or installable code, which, upon compilation and/or installation on the computing system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of radio frequency (RF) sensing for human identification, the method comprising: obtaining channel state information (CSI) data corresponding to a set of RF signals received by one or more receiving devices, wherein: the set RF signals comprises two or more reflected RF signals successively received by the one or more receiving devices after being reflected from a person, and the two or more reflected RF signals are received by the one or more receiving devices over a period of time; determining an identity of the person based at least in part on an observed gait of the person and an observed shape of the person, wherein the observed gait of the person and the observed shape of the person are determined based at least in part on the CSI data; and outputting an indication of the determined identity of the person.

Clause 2: The method of clause 1, wherein: the set of RF signals further comprises at least one direct path RF signal that does not reflect from the person; and the observed shape of the person is determined using CSI data corresponding to the at least one direct path RF signal and the two or more reflected RF signals.

Clause 3: The method of any of clauses 1-2 wherein the observed shape of the person is determined using Time of Flight (ToF) information and Angle of Arrival (AoA) information obtained from the CSI.

Clause 4: The method of any of clauses 1-3 wherein the observed gait of the person is determined using Doppler Frequency Shift (DFS) obtained from the CSI.

Clause 5: The method of any of clauses 1-4 wherein determining the identity of the person based at least in part on the observed gait of the person and the observed shape of the person comprises: processing DFS obtained from the CSI with a first neural network to perform gait recognition of the person; and processing ToF and AoA information obtained from the CSI with a second neural network to perform shape recognition of the person.

Clause 6: The method of clause 5 wherein determining the identity of the person based at least in part on the observed gait of the person and the observed shape of the person further comprises combining an output of the gait recognition with an output of the shape recognition.

Clause 7: The method of any of clauses 1-6 wherein outputting an indication of the determined identity of the person comprises: providing the indication of the determined identity with a user interface, sending the indication of the determined identity to a device, or providing the indication of the determined identity to an application layer of a device, or a combination thereof.

Clause 8: The method of any of clauses 1-7 wherein the one or more receiving devices comprise a transmitting device that transmits the set of RF signals.

Clause 9: The method of any of clauses 1-7 wherein the set of RF signals are transmitted from a transmitting device, separate from the one or more receiving devices.

Clause 10: The method of any of clauses 1-9 wherein the RF signals comprise: one or more Wireless Local Area Network (WLAN) signals, one or more Bluetooth signals, one or more ultra-wideband (UWB) signals, or one or more cellular signal, or a combination thereof.

Clause 11: A device for radio frequency (RF) sensing for human identification, the device comprising: one or more transceivers; a memory; and one or more processors communicatively coupled with the one or more transceivers and the memory, wherein the one or more processors are configured to: obtain channel state information (CSI) data corresponding to a set of RF signals received by one or more receiving devices, wherein: the set RF signals comprises two or more reflected RF signals successively received by the one or more receiving devices after being reflected from a person, and the two or more reflected RF signals are received by the one or more receiving devices over a period of time; determine an identity of the person based at least in part on an observed gait of the person and an observed shape of the person, wherein the observed gait of the person and the observed shape of the person are determined based at least in part on the CSI data; and output an indication of the determined identity of the person.

Clause 12: The device of clause 11, wherein the one or more processors are further configured to determine the observed shape of the person using CSI data corresponding to (i) at least one direct path RF signal in the set of RF signals that does not reflect from the person and (ii) the two or more reflected RF signals.

Clause 13: The device of any of clauses 11-12 wherein the one or more processors are configured to determine the observed shape of the person using Time of Flight (ToF) information and Angle of Arrival (AoA) information obtained from the CSI.

Clause 14: The device of any of clauses 11-13 wherein the one or more processors are configured to determine the observed gait of the person using Doppler Frequency Shift (DFS) obtained from the CSI.

Clause 15: The device of any of clauses 11-14 wherein, to determine the identity of the person based at least in part on the observed gait of the person and the observed shape of the person, the one or more processors are configured to process DFS obtained from the CSI with a first neural network to perform gait recognition of the person; and process ToF and AoA information obtained from the CSI with a second neural network to perform shape recognition of the person.

Clause 16: The device of clause 15 wherein, to determine the identity of the person based at least in part on the observed gait of the person and the observed shape of the person, the one or more processors are configured to combine an output of the gait recognition with an output of the shape recognition.

Clause 17: The device of any of clauses 11-16 wherein, to output an indication of the determined identity of the person, the one or more processors are configured to provide the indication of the determined identity with a user interface, send, via the one or more transceivers, the indication of the determined identity to a second device, or provide the indication of the determined identity at an application layer of the device, or a combination thereof.

Clause 18: The device of any of clauses 11-17 wherein the one or more processors are further configured to transmit the set of RF signals via the one or more transceivers.

Clause 19: The device of any of clauses 11-17 wherein the device comprises a receiving device of the one or more receiving devices.

Clause 20: The device of clause 19 wherein the receiving device is separate from a transmitting device configured to transmit the set of RF signals.

Clause 21: The device of any of clauses 11-20 wherein the RF signals comprise: one or more Wireless Local Area Network (WLAN) signals, one or more Bluetooth signals, one or more ultra-wideband (UWB) signals, or one or more cellular signal, or a combination thereof.

Clause 22: An apparatus for radio frequency (RF) sensing for human identification, the apparatus comprising: means for obtaining channel state information (CSI) data corresponding to a set of RF signals received by one or more receiving devices, wherein: the set RF signals comprises two or more reflected RF signals successively received by the one or more receiving devices after being reflected from a person, and the two or more reflected RF signals are received by the one or more receiving devices over a period of time; means for determining an identity of the person based at least in part on an observed gait of the person and an observed shape of the person, wherein the observed gait of the person and the observed shape of the person are determined based at least in part on the CSI data; and means for outputting an indication of the determined identity of the person.

Clause 23: The apparatus of clause 22, further comprising means for determining the observed shape of the person using CSI data corresponding to (i) at least one direct path RF signal in the set of RF signals that does not reflect from the person and (ii) the two or more reflected RF signals.

Clause 24: The apparatus of any of clauses 22-23 further comprising means for determining the observed shape of the person using Time of Flight (ToF) information and Angle of Arrival (AoA) information obtained from the CSI.

Clause 25: The apparatus of any of clauses 22-24 further comprising means for determining the observed gait of the person using Doppler Frequency Shift (DFS) obtained from the CSI.

Clause 26: The apparatus of any of clauses 22-25 wherein the means for determining the identity of the person based at least in part on the observed gait of the person and the observed shape of the person comprises: means for processing DFS obtained from the CSI with a first neural network to perform gait recognition of the person; and means for processing ToF and AoA information obtained from the CSI with a second neural network to perform shape recognition of the person.

Clause 27: The apparatus of clause 26 wherein the means for determining the identity of the person based at least in part on the observed gait of the person and the observed shape of the person further comprises means for combining an output of the gait recognition with an output of the shape recognition.

Clause 28: The apparatus of any of clauses 22-27 wherein the means for outputting an indication of the determined identity of the person comprises: means for providing the indication of the determined identity with a user interface, means for sending the indication of the determined identity to a device, or means for providing the indication of the determined identity to an application layer of a device, or a combination thereof.

Clause 29: The apparatus of any of clauses 22-28 further comprising means for transmitting the set of RF signals.

Clause 30: The apparatus of any of clauses 22-29 wherein the RF signals comprise: one or more Wireless Local Area Network (WLAN) signals, one or more Bluetooth signals, one or more ultra-wideband (UWB) signals, or one or more cellular signal, or a combination thereof.

Clause 31: A non-transitory computer-readable medium storing instructions for radio frequency (RF) sensing for human identification, the instructions comprising code for: obtaining channel state information (CSI) data corresponding to a set of RF signals received by one or more receiving devices, wherein: the set RF signals comprises two or more reflected RF signals successively received by the one or more receiving devices after being reflected from a person, and the two or more reflected RF signals are received by the one or more receiving devices over a period of time; determining an identity of the person based at least in part on an observed gait of the person and an observed shape of the person, wherein the observed gait of the person and the observed shape of the person are determined based at least in part on the CSI data; and outputting an indication of the determined identity of the person.

What is claimed is:

1. A method of radio frequency (RF) sensing for human identification, the method comprising:
obtaining channel state information (CSI) data corresponding to a set of RF signals received by one or more receiving devices, wherein:
the set RF signals comprises two or more reflected RF signals successively received by the one or more receiving devices after being reflected from a person, and
the two or more reflected RF signals are received by the one or more receiving devices over a period of time;
determining an identity of the person based at least in part on an observed gait of the person and an observed shape of the person, wherein the observed gait of the person and the observed shape of the person are determined based at least in part on the CSI data; and
outputting an indication of the determined identity of the person.

2. The method of claim 1, wherein:
the set of RF signals further comprises at least one direct path RF signal that does not reflect from the person; and
the observed shape of the person is determined using CSI data corresponding to the at least one direct path RF signal and the two or more reflected RF signals.

3. The method of claim 1, wherein the observed shape of the person is determined using Time of Flight (ToF) information and Angle of Arrival (AoA) information obtained from the CSI.

4. The method of claim 1, wherein the observed gait of the person is determined using Doppler Frequency Shift (DFS) obtained from the CSI.

5. The method of claim 1, wherein determining the identity of the person based at least in part on the observed gait of the person and the observed shape of the person comprises:
processing DFS obtained from the CSI with a first neural network to perform gait recognition of the person; and
processing ToF and AoA information obtained from the CSI with a second neural network to perform shape recognition of the person.

6. The method of claim 5, wherein determining the identity of the person based at least in part on the observed gait of the person and the observed shape of the person further comprises combining an output of the gait recognition with an output of the shape recognition.

7. The method of claim 1, wherein outputting an indication of the determined identity of the person comprises:
providing the indication of the determined identity with a user interface,
sending the indication of the determined identity to a device, or
providing the indication of the determined identity to an application layer of a device, or
a combination thereof.

8. The method of claim 1, wherein the one or more receiving devices comprise a transmitting device that transmits the set of RF signals.

9. The method of claim 1, wherein the set of RF signals are transmitted from a transmitting device, separate from the one or more receiving devices.

10. The method of claim 1, wherein the RF signals comprise:
one or more Wireless Local Area Network (WLAN) signals,
one or more Bluetooth signals,
one or more ultra-wideband (UWB) signals, or
one or more cellular signals, or
a combination thereof.

11. A device for radio frequency (RF) sensing for human identification, the device comprising:
one or more transceivers;
a memory; and
one or more processors communicatively coupled with the one or more transceivers and the memory, wherein the one or more processors are configured to:

obtain channel state information (CSI) data corresponding to a set of RF signals received by one or more receiving devices, wherein:
the set RF signals comprises two or more reflected RF signals successively received by the one or more receiving devices after being reflected from a person, and
the two or more reflected RF signals are received by the one or more receiving devices over a period of time;
determine an identity of the person based at least in part on an observed gait of the person and an observed shape of the person, wherein the observed gait of the person and the observed shape of the person are determined based at least in part on the CSI data; and
output an indication of the determined identity of the person.

12. The device of claim 11, wherein the one or more processors are further configured to determine the observed shape of the person using CSI data corresponding to (i) at least one direct path RF signal in the set of RF signals that does not reflect from the person and (ii) the two or more reflected RF signals.

13. The device of claim 11, wherein the one or more processors are configured to determine the observed shape of the person using Time of Flight (ToF) information and Angle of Arrival (AoA) information obtained from the CSI.

14. The device of claim 11, wherein the one or more processors are configured to determine the observed gait of the person using Doppler Frequency Shift (DFS) obtained from the CSI.

15. The device of claim 11, wherein, to determine the identity of the person based at least in part on the observed gait of the person and the observed shape of the person, the one or more processors are configured to:
process DFS obtained from the CSI with a first neural network to perform gait recognition of the person; and
process ToF and AoA information obtained from the CSI with a second neural network to perform shape recognition of the person.

16. The device of claim 15, wherein, to determine the identity of the person based at least in part on the observed gait of the person and the observed shape of the person, the one or more processors are configured to combine an output of the gait recognition with an output of the shape recognition.

17. The device of claim 11, wherein, to output an indication of the determined identity of the person, the one or more processors are configured to:
provide the indication of the determined identity with a user interface,
send, via the one or more transceivers, the indication of the determined identity to a second device, or
provide the indication of the determined identity at an application layer of the device, or
a combination thereof.

18. The device of claim 11, wherein the one or more processors are further configured to transmit the set of RF signals via the one or more transceivers.

19. The device of claim 11, wherein the device comprises a receiving device of the one or more receiving devices.

20. The device of claim 19, wherein the receiving device is separate from a transmitting device configured to transmit the set of RF signals.

21. The device of claim 11, wherein the RF signals comprise:
one or more Wireless Local Area Network (WLAN) signals,
one or more Bluetooth signals,
one or more ultra-wideband (UWB) signals, or
one or more cellular signals, or
a combination thereof.

22. An apparatus for radio frequency (RF) sensing for human identification, the apparatus comprising:
means for obtaining channel state information (CSI) data corresponding to a set of RF signals received by one or more receiving devices, wherein:
the set RF signals comprises two or more reflected RF signals successively received by the one or more receiving devices after being reflected from a person, and
the two or more reflected RF signals are received by the one or more receiving devices over a period of time;
means for determining an identity of the person based at least in part on an observed gait of the person and an observed shape of the person, wherein the observed gait of the person and the observed shape of the person are determined based at least in part on the CSI data; and
means for outputting an indication of the determined identity of the person.

23. The apparatus of claim 22, further comprising means for determining the observed shape of the person using CSI data corresponding to (i) at least one direct path RF signal in the set of RF signals that does not reflect from the person and (ii) the two or more reflected RF signals.

24. The apparatus of claim 22, further comprising means for determining the observed shape of the person using Time of Flight (ToF) information and Angle of Arrival (AoA) information obtained from the CSI.

25. The apparatus of claim 22, further comprising means for determining the observed gait of the person using Doppler Frequency Shift (DFS) obtained from the CSI.

26. The apparatus of claim 22, wherein the means for determining the identity of the person based at least in part on the observed gait of the person and the observed shape of the person comprises:
means for processing DFS obtained from the CSI with a first neural network to perform gait recognition of the person; and
means for processing ToF and AoA information obtained from the CSI with a second neural network to perform shape recognition of the person.

27. The apparatus of claim 26, wherein the means for determining the identity of the person based at least in part on the observed gait of the person and the observed shape of the person further comprises means for combining an output of the gait recognition with an output of the shape recognition.

28. The apparatus of claim 22, wherein the means for outputting an indication of the determined identity of the person comprises:
means for providing the indication of the determined identity with a user interface,
means for sending the indication of the determined identity to a device, or
means for providing the indication of the determined identity to an application layer of a device, or
a combination thereof.

29. The apparatus of claim 22, further comprising means for transmitting the set of RF signals.

30. The apparatus of claim 22, wherein the RF signals comprise:
one or more Wireless Local Area Network (WLAN) signals,
one or more Bluetooth signals,
one or more ultra-wideband (UWB) signals, or
one or more cellular signals, or
a combination thereof.

31. A non-transitory computer-readable medium storing instructions for radio frequency (RF) sensing for human identification, the instructions comprising code for:
obtaining channel state information (CSI) data corresponding to a set of RF signals received by one or more receiving devices, wherein:
the set RF signals comprises two or more reflected RF signals successively received by the one or more receiving devices after being reflected from a person, and
the two or more reflected RF signals are received by the one or more receiving devices over a period of time;
determining an identity of the person based at least in part on an observed gait of the person and an observed shape of the person, wherein the observed gait of the person and the observed shape of the person are determined based at least in part on the CSI data; and
outputting an indication of the determined identity of the person.

* * * * *